United States Patent [19]
Wentworth, Jr.

[11] 4,016,837
[45] Apr. 12, 1977

[54] VAPOR INTAKE SYSTEM FOR INTERNAL COMBUSTION ENGINES

[76] Inventor: Fred A. Wentworth, Jr., 20 Heights Road, Stratham, N.H. 03885

[22] Filed: Oct. 17, 1974

[21] Appl. No.: 515,527

Related U.S. Application Data

[63] Continuation-in-part of Ser. No. 430,252, Jan. 2, 1974, Pat. No. 3,867,819.

[52] U.S. Cl. .............................. 123/25 R; 261/18 A
[51] Int. Cl.² ......................................... F02D 19/00
[58] Field of Search ............. 123/25 R, 25 A, 25 L, 123/25 B, 1 A, 25 E, 25 G; 261/18 A, 30, DIG. 66; 431/4

[56] References Cited
UNITED STATES PATENTS

| | | | |
|---|---|---|---|
| 1,618,602 | 2/1927 | Meyers et al. | 123/25 A |
| 1,734,872 | 11/1929 | Nash et al. | 123/25 A |
| 2,122,414 | 7/1938 | Foster | 123/25 A |
| 2,890,029 | 6/1959 | Hicks | 261/18 A |
| 3,044,453 | 7/1962 | Hoffmann | 123/25 B |
| 3,716,040 | 2/1973 | Herpin | 123/25 R X |
| 3,749,376 | 7/1973 | Alm et al. | 123/1 A X |
| 3,767,172 | 10/1973 | Mills | 123/25 R X |

Primary Examiner—C. J. Husar
Assistant Examiner—Ira S. Lazarus
Attorney, Agent, or Firm—Thomas N. Tarrant

[57] ABSTRACT

A system including a water container, a connecting line from the top of the water container to the air intake of an internal combustion engine, a blower, and a line connected to receive positive air pressure from the blower and conduct it to a point below the surface of water in the water container.

8 Claims, 3 Drawing Figures

VAPOR INTAKE SYSTEM FOR INTERNAL COMBUSTION ENGINES

CROSS REFERENCE TO RELATED APPLICATIONS

The present application is a continuation in part of my prior pending application, Ser. No. 430,252 filed Jan. 2, 1974 entitled Fuel Catalyzer now U.S. Pat. No. 3,867,819.

BACKGROUND OF THE INVENTION

1. Field of the Invention

The present invention relates to energy boosters for fossil fuel combustion systems and in particular to such boosters providing controlled water vapor content.

2. Description of the Prior Art

It is well known that high humidity can improve the performance of an internal combustion engine. Various water injectors have been marketed with allegations of improved economy and performance for automobile engines. Commercial oil burners have long utilized steam to atomize oil for improved combustion.

In all of these arrangements, any additional energy produced must be due either to energy conversion from the additional mass provided or energy due to a more efficient or complete conversion of the fossil fuel. With water as the agent, either of these is possible and some combination is probable in most cases. Mostly, substantial quantities of moisture addition have been used. In automotive engines, this has usually resulted in short engine life, burned valves and other difficulties. The cost of accessory equipment has apparently been a deterrent in home heating service.

It is also known that water vapor can act as a catalyzer for combustion. See Van Nostrand's Scientific Encyclopedia, fourth edition, page 1501. Useful implementation of this phenomenon is strangely lacking in most commercial production of combustion devices.

SUMMARY OF THE INVENTION

In accordance with the invention, air space above water in a container of water is connected to the air intake of an internal combustion engine and a second connection is made from below the water surface in said container to a positive pressure source that varies in pressure directly proportional to engine speed. The connections are made such that at idle and low speeds neither the negative pressure at the engine air intake or the positive pressure (from radiator fan or other) blower driven by the engine) are sufficient alone to produce bubbling through the water. However, the two combined will cause bubbling. A nonmiscible supernatant liquid layer is preferably used over the water. A further embodiment is a closed loop system in which a blower takes air from the air intake (inside the air cleaner) and blows it into the underwater connection. The negative pressure line remains the same but the affect of engine vacuum is balanced out. A modification of the latter embodiment utilizes the supercharger blower on a "blown" engine as the blower in the closed loop.

Supplanting all or part of engine vacuum, which is nonlinear to engine speed, with a positive pressure drive proportional to engine speed achieves a better control over intake water vapor than is achieved by intake vacuum alone.

Thus, it is an object of the invention to provide a novel intake water vapor system for internal combustion engines that is responsive to pressure from a blower driven proportional to engine speed.

Further objects and features of the invention will become apparent upon reading the following description together with the drawings.

DESCRIPTION OF THE PREFERRED EMBODIMENTS

Figure 1:
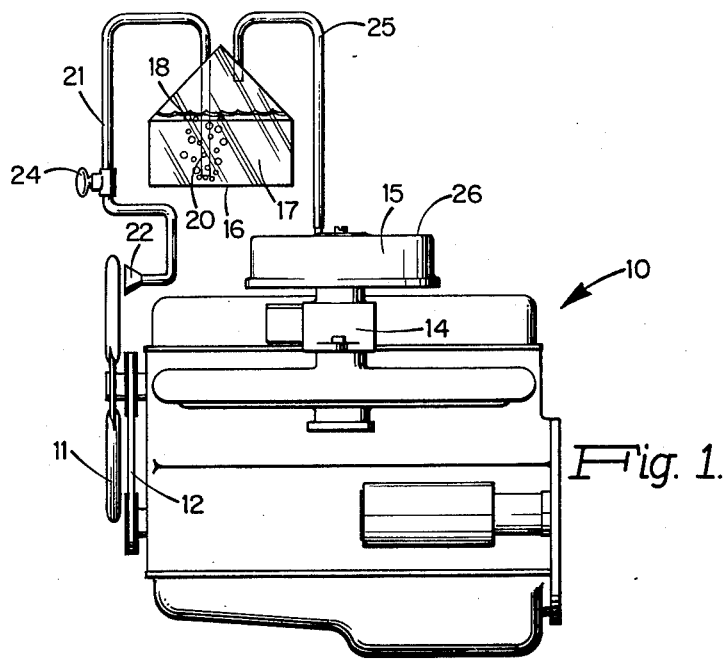
FIG. 1 is a perspective view of a gasoline engine incorporating the inventive intake vapor system.

Conventional gasoline engine 10 as depicted in FIG. 1 has carburetor 14 which receives outside air through air cleaner 15. Engine 10 also has radiator cooling fan 11 connected to one end and driven through fan belt 12 by the engine crank shaft.

Liquid container 16, depicted as a transparent plastic container having a pyramidal top, carries a supply of water 17 with supernatant nonmiscible layer 18. While layer 18 may be oil, one specific reason for its use is to prevent natural evaporation into or absorption from the enclosed air space. Thus, many nonmiscible liquids can be used. The thickness of layer 18 and the viscosity of the liquid in layer 18 are selected to provide a layer that will maintain some integrity in the presence of turbulence due to bubbling and at the same time will not unduly impede bubbling action. The vapor pressure of the liquid in layer 18 should be negligible. A thickness for layer 18 of about one to five millimeters and an SAE viscosity of about 10 has proven suitable. Synthetic oils formulated for two cycle engines have proven satisfactory. The optimum material is not known, but experiment indicates that there is a large toleraance factor so that precise characteristics are noncritical. Pipe 20 extends through the top of container 16 and down below the water surface level of water 17. The extent of penetration into the water is not critical and if a slot or row of perforations extend from the end of the pipe 20 up to the water level, pipe 20 may extend right to the bottom. Otherwise, a penetration of about one centimeter has been found suitable. The actual optimum penetration in any given installation is affected by both the positive and negative pressures produced and adjustment on an empirical basis is usual.

Pipe 20 is connected by a first conduit shown as hose 21 to scoop 22 facing the exhaust side of a blower such as fan 11. In some cases, particularly where the radiator cooling fan is controlled by a thermostatically operated clutch, another available source such as an alternator cooling fan can be utilized. Hose 21 suitably has an inside diameter in the range of five to 15 millimeters and air flow through it is adjustable by means of valve 24 in hose line 21 or by a shutter mechanism in scoop 22. Scoop 22 as depicted is a funnel shaped scoop with an opening up to 10 centimeters in diameter. In installations using 10 to 15 millimeters I.D. hose, it is frequently unnecessary to utilize a scoop.

Second conduit shown as hose 25 connects from or near the apex of container 16 to the engine air intake shown in FIG. 1 as air filter 15. Hose 25 is suitably connected to an aperture in cover 26 of filter 15 at a point inside the filter element and open to the throat of carburetor 14.

Figure 2:
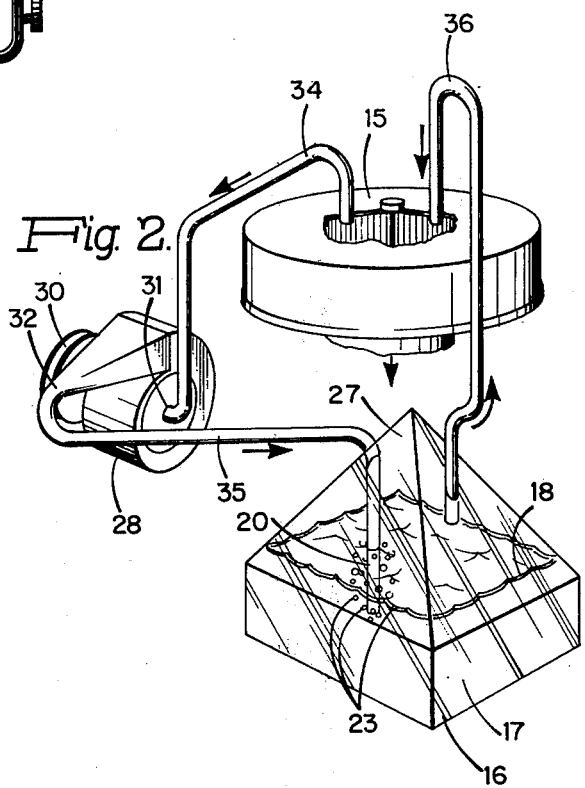
FIG. 2 is a perspective view of an embodiment of the invention using a closed loop system on a gasoline engine.

The use of engine vacuum as a direct force in the vapor-producing cycle is not really desirable. The affects of engine vacuum can be rendered negligible in blown (supercharged) engines or by adding a specialized blower to the vapor generator. The specialized blower arrangement is depicted in FIG. 2. FIG. 2 is drawn in perspective illustrating pyramidal top 27 of container 16 and also, by cutaway, the relationship of the hose connections to the air filter element. Specialized blower 28 is driven by pulley 30 which is conveniently designed for operation by fan belt 12 (FIG. 1). Both intake 31 and exhaust 32 of blower 28 are sealed except for the connections of hose 34 and hose 35 respectively. Hose 34 is connected to air filter 15 to draw air from inside the air filter, hose 35 is connected to provide air pressure from blower 28 to pipe 20 in container 16 and hose 36 is connected from pyramidal top 27 to exhaust vapor laden air to the inside of air filter 15.

In the arrangement of FIG. 2 there are no specific critical sizes or pressures; however, the system must be designed to provide a slow but steady stream of bubbles 23 at idling speed for the engine. This is obtained by suitable selection of the system parameters or by the use of a valve such as valve 24 (FIG. 1). It will be noted that, since hoses 34 and 36 are symmetrically located relative to the engine intake, the affects of engine vacuum are balanced out.

Figure 3:
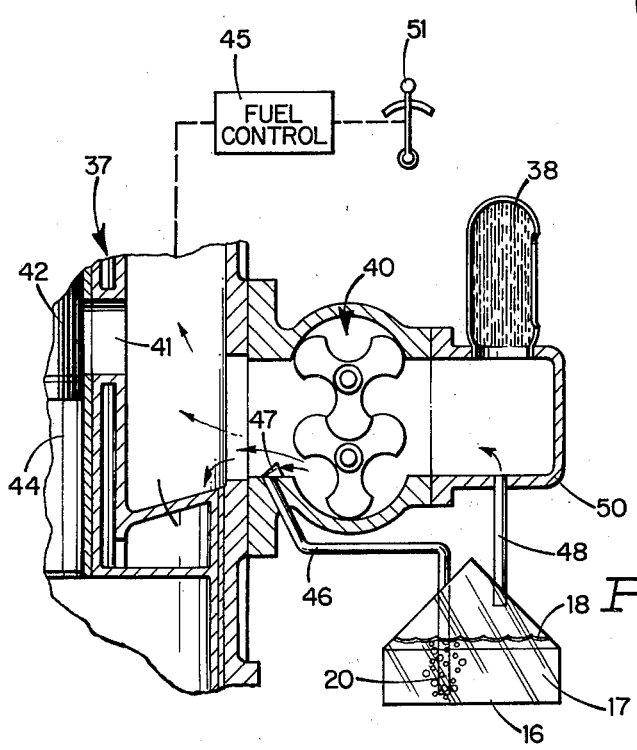
FIG. 3 is a perspective view of an embodiment of the invention utilizing the intake blower of a blown diesel as the blower.

FIG. 3 illustrates the blown engine version and specifically illustrates a diesel engine where the fuel is injected (not shown) and the air intake is independent of fuel intake. Diesel engine 37 is a two cycle diesel having air intake filter 38 followed by blower 40. Air driven by blower 40 passes in through intake port 41 and is eventually compressed by piston 42 in cylinder 44 to the ignition temperature of diesel fuel which is then injected under control of fuel control 45. The vapor generator system of the invention utilizes blower 40 as the driving force.

Blower 40 is mechanically coupled to the drive of engine 37 so that its speed is directly proportional to engine speed. Hose 48 connects pyramidal top 27 of container 16 to intake manifold 50 between air filter 38 and blower 40. Hose 46 connects pipe 20 in container 16 to intake manifold 50 between blower 40 an intake ports 41. Air scoop 47 is provided inside manifold 50 at the aperture provided for hose 46 in order to direct air flow from blower 40 down hose 46.

As in the previously described embodiments, the hose and scoop parameters can be selected for optimum operation for a particular engine or a valve may be introduced into otherwise oversized lines to adjust for optimum performance with slow bubbling at idle speed.

Manual control 51 is the usual manual adjustor for fuel control 45 to change engine speed.

While FIG. 3 has been described with relation to a two-cycle diesel, the same concept with minor design changes is applicable to four cycle diesels and two and four cycle supercharged gasoline engines either with or without fuel injection. It will be understood that container 16 is filled and can have its contents replenished by removing one of the hose connections for access. A third hole may also be provided in pyramidal top 27 is desired for fill purposes and a suitable cap supplied.

Although the invention has been described with specific relation to internal combustion reciprocating engines, it is equally applicable and within the obvious skill of the art to apply it to rotary engines both of the continuous, i.e., turbine, and cyclical, i.e. Wankel, internal combustion types. Thus, it is intended to cover the invention as set forth in the full scope of the appended claims.

I claim:

1. In an internal combustion engine having an air intake system, an output drive system and a vapor generating system for adding water vapor to the air intake system, the improvement in said vapor generating system comprising:
   a. blower means having an inlet connection and an outlet connection;
   b. a closed container for water;
   c. a first conduit having a first end connected to said outlet connection and a second end connection to a pipe extending below water level in said container;
   d. a second conduit having a first end connected to said container above water level and a second end connected to the air intake system of said engine; and,
   e. a third conduit having a first end connected to the air intake system of said engine and a second end connected to said inlet connection, whereby said blower means repeatedly recirculation air from said air intake system back to said air intake system through water in said container in order to maintain a controlled humidity condition in said intake system.

2. The improvement according to claim 1 wherein said container is partially filled with water and said water carries a supernatant layer of the nonmiscible liquid whereby air flow from said blower passing through said pipe produces bubbles which transport minute quantities of water through said nonmiscible layer which then acts as a barrier against other transfer mechanisms.

3. The improvement according to claim 1 wherein said container has a pyramidal top to which said second conduit is connected.

4. The improvement according to claim 1 wherein said air intake system includes an air filter having a filter element and a carburetor connected to said air filter, and said second conduit and the first end of said third conduit are connected to said air filter following said filter element and preceding said carburetor in the intake air path.

5. The improvement according to claim 4 wherein said second conduit and this first end of said conduit are connected symmetrically relative to the engine intake so as to balance out the effects of engine vacuum.

6. The improvement according to claim 1 wherein said blower is part of said air intake system, said first conduit has its first end connected to said air intake system following said blower, said second conduit has its second end connected to said air intake system preceding said blower and said third conduit is the portion of said air intake system between the connection for the second end of said second conduit and said blower.

7. The improvement according to claim 6 wherein said blower is a forced air input blower in a diesel engine and said first conduit has its first end terminated with a scoop for directing air flow from said blower through said first conduit and down said pipe.

8. The improvement according to claim 1 wherein said blower means is connected to be driven by the output drive system of said engine.

* * * * *